United States Patent [19]
Antonacci

[11] 3,914,843
[45] Oct. 28, 1975

[54] METHOD OF CONNECTING A METAL CONDUIT TO A PLASTIC CONDUIT

[75] Inventor: Donald W. Antonacci, Cocoa Beach, Fla.

[73] Assignee: The United States of America as represented by the Secretary of the Air Force, Washington, D.C.

[22] Filed: Dec. 20, 1974

[21] Appl. No.: 535,067

Related U.S. Application Data

[62] Division of Ser. No. 289,695, Sept. 15, 1972, abandoned.

[52] U.S. Cl. .............. 29/157; 29/526; 52/220; 285/158; 285/174; 285/238; 285/363
[51] Int. Cl.² ............... B21D 53/00; B21K 29/00; B23P 15/26
[58] Field of Search ...... 29/157, 526 X; 285/238 X, 285/158 X, 363, 174 X, 368; 52/220 X

[56] References Cited
UNITED STATES PATENTS

| | | | |
|---|---|---|---|
| 1,908,796 | 5/1933 | Suchan........................ | 285/158 UX |
| 2,146,218 | 2/1939 | Kimmich et al. ............. | 285/238 X |
| 2,268,385 | 12/1941 | Davis et al. .................. | 285/238 |
| 2,303,311 | 11/1942 | Gredell ........................ | 285/368 X |
| 2,929,645 | 3/1960 | Meckenstock ................ | 285/238 |
| 3,235,291 | 2/1966 | Jacoby ......................... | 285/368 X |
| 3,265,414 | 8/1966 | Reid et al. ................... | 285/363 X |
| 3,351,361 | 11/1967 | Martin ......................... | 285/158 X |
| 3,537,729 | 11/1970 | Burkett........................ | 285/368 X |
| 3,551,006 | 12/1970 | James .......................... | 285/368 X |
| 3,627,357 | 12/1971 | Sanders........................ | 285/174 |

*Primary Examiner*—Charlie T. Moon
*Attorney, Agent, or Firm*—Joseph E. Rusz; Arsen Tashjian

[57] ABSTRACT

The basic inventive method includes the steps of: affixing, preferably by welding, a metallic flange to the appropriate end of the metallic conduit; affixing, preferably by bonding with epoxy, a plastic flange to the adjacent, oppositely disposed end of the plastic conduit; interposing a gasket, preferably of the full face type, made of suitable material, such as asbestos, between the metallic and the plastic flanges; and, connecting together, in a releasable manner, such as by use of bolting means, the metallic flange, the gasket, and the plastic flange. The method can be used, and can be adapted to be used, to meet varying requirements for different applications, including for forming an integrated pipe system used underground, in conjunction with a coaxially positioned inner metallic pipe, surrounded by suitable thermal insulating material, which conducts a thermally active fluid, such as steam.

1 Claim, 4 Drawing Figures

3,914,843

METHOD OF CONNECTING A METAL CONDUIT TO A PLASTIC CONDUIT

STATEMENT OF GOVERNMENT INTEREST

The invention described herein may be manufactured and used by or for the Government for governmental purposes without the payment of any royalty thereon.

CROSS REFERENCE TO RELATED APPLICATION

This application is a division of copending U.S. Pat. application Ser. No. 289,695, filed on Sept. 25, 1972, now abandoned.

BACKGROUND OF THE INVENTION

This invention relates to the conduit and to the connecting arts and, more particularly, to a novel method which permits the releasable connection of a metallic conduit to an adjacent, axially aligned plastic conduit.

As a preliminary matter, it is to be noted that the term "conduit", as used herein, is intended to include pipes, tubes, hollow cylinders, and the like. Additionally, it is also to be noted that the phrase "longitudinal axis", or the like, is intended to mean the main (or central) geometric axis of the particular component, element, and the like.

The connection of conduits, including the connection of pipe sections to form an integrated and unitary steam line pipe and system thereof, is per se old and well known. With reference to steam line pipe systems, some of these systems are specifically for use underground (i.e., subsoil). The underground steam line pipe systems, which are referred to herein merely as an example, conventionally comprise pipe sections which have an outer conduit made of metal and which have within the metallic conduit a coaxially disposed steam line pipe surrounded by thermal insulating material. Such a pipe system is only minimally satisfactory at best, simply because the outer metallic conduit has the inherent disadvantage of corroding, rusting, or the like. The predictable and foreseeable result is that, in time, the outer metallic conduit components, which are typically welded together end-to-end, are rendered functionally useless, because of the cumulative undesirable effects of the subsoil (i.e., below ground) elements, such as water.

Therefore, it is fair and accurate to state that the state-of-the-art with respect to conduits, and connections thereof, including pipe systems, particularly for use underground, and more particularly for use in conveying thermally active fluids (such as steam) underground, is that such conduits are not of the desired degree of suitability, and that they constitute a compromise or trade-off between suitability for the purpose intended and ease and rapidity in assembling the conduits, piping, and components thereof.

Due to my formal training, experience, and knowledge of the prior art, I have concluded that a plastic outer conduit, such as one made of fiberglass reinforced plastic, is far superior to metallic conduits, particularly if the outer conduit is to be used underground, simply because a plastic conduit does not corrode, rust, rot, or the like, and remains functionally useful indefinitely. There is no problem that I am aware of which prevents or makes difficult the connection of plastic conduits. However, there are requirements sometimes to connect plastic conduits to metallic conduits, such as in connecting a plastic conduit to the metallic conduit which is conventionally part of an anchor plate assembly of an underground steam line piping system. I am not aware of any known method presently available in the art for connecting a plastic conduit to a metallic conduit in a satisfactory manner.

I have invented such a method, (i.e., a method of connecting a plastic conduit to a metallic conduit, and vice versa); and, as a result, I have significantly advanced the state-of-the-art.

SUMMARY OF THE INVENTION

This invention relates to a novel method of connecting a metallic conduit to a plastic conduit, and vice versa, in an adaptation ideally suitable with regard to a piping system used underground for containing thermally active fluid, such as steam.

Therefore, the principal object of this invention is to provide such a novel method.

Another object of this invention is to provide such a novel method which, in addition, will permit the connecting of the metallic conduit to the plastic conduit in a releasable manner.

These objects, and other equally important and related objects, of this invention will become readily apparent after a consideration of the description of my basic inventive method and reference to the drawings.

DESCRIPTION OF THE INVENTIVE METHOD

1. GENERIC METHOD

My inventive method of connecting a metallic conduit to a plastic conduit, and vice versa, in a releasable manner, includes (in the generic, broad, and most simple approach) five basic steps which, of course, may be varied in sequence to achieve the same result.

Figure 1:
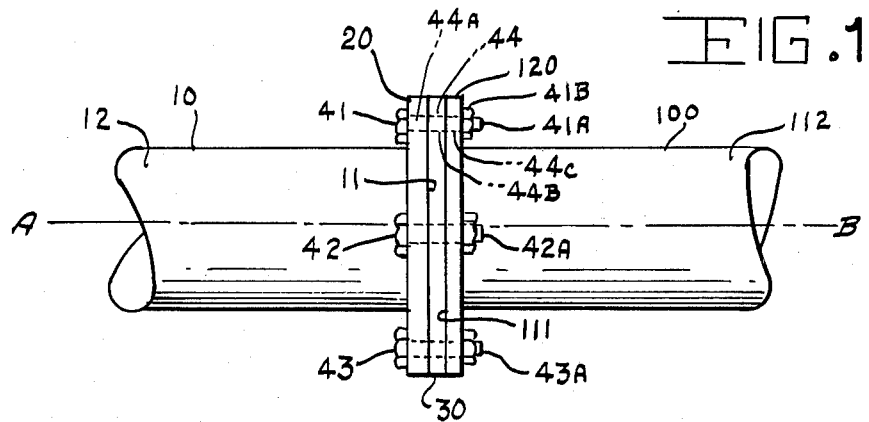
FIG. 1 is a side elevation view, in simplified form, partially fragmented, of a plastic conduit connected to an adjacent metallic conduit, end-to-end and axially aligned, by the use of my basic inventive method.

The result of the five basic steps of my inventive method is clearly shown in the simplified drawing depicted in FIG. 1. Therefore, reference is made to said FIG. 1, which shows plastic conduit 10 releasably connected to metallic conduit 100 by any method. Plastic conduit 10 has a free (i.e., unencumbered) and open end 11; has an external surface 12; and, has a central geometric axis, in this case a longitudinal axis. Metallic conduit 100 has a free (i.e., unencumbered) and open end 111; has an external surface 112; and, has a central geometric axis, in this case a longitudinal axis.

Firstly, I affix, by suitable means such as by welding, a metallic flange 120 to the free and open end 111 of metallic conduit 100. If the metallic conduit 100 is made of steel, as it is conventionally, then the metallic flange 120, would also, as a matter of preference, be made of steel. Of course, a flange either of the slip on or of the butt weld type may be used.

Next, I affix, by suitable means such as by bonding with epoxy, a plastic flange 20 to the free and open end 11 of plastic conduit 10. If the plastic conduit 10 is made of fiberglass reinforced plastic, which is what I prefer, then, also as a matter of preference, the plastic flange 20 used would also, as a matter of preference, be made of fiberglass reinforced plastic.

Then, I position the metallic conduit 100 and the plastic conduit 10 so that they are longitudinally and axially aligned, and so that they are facing open end (111)-to-open end (11), and also so that they are adjacent to each other, with the metallic flange 120 directionally disposed (and opposed) to the plastic flange 20, as shown in FIG. 1. As a result of the longitudinal and axial alignment of conduits 10 and 100, the longitudinal axis of each coincide, and the resultant coincident longitudinal axis is designated as A-B in FIG. 1.

Next, I interpose a gasket 30, preferably of the full face type, of suitable material (such as asbestos, if the conduits and flanges are to be used in a steam line pipe system) between, and abutting with, the metallic flange 120 and the plastic flange 20, also as shown in FIG. 1.

Finally, and fifthly, I connect together, in a releasable manner, the metallic flange 120, the gasket 30, and the plastic flange 20. Thereby, I releasably connect, indirectly, the metallic conduit 100 to the plastic conduit 10. The means for releasably connecting the flanges 10 and 100 may comprise bolting means, which includes: a plurality of bolts, preferably of the insulating type such as 41, 42 and 43, each of which has a threaded shank portion, such as respectively 41A, 42A and 43A, which passes into and through a different one of a plurality of horizontally disposed continuous hollow passages, such as the one which is generally designated 44, which, in turn, is formed, in order, by plastic flange hole 44A, gasket hole 44B, and metallic flange hole 44C, which are in registration; and, a suitably threaded nut, preferably of the insulating type, for each of said plurality of bolts, with each nut, such as 41B, removably fitted on its respective bolt, such as 41, on the threaded portion thereof, such as 41A, which protrudes from the last, such as 44C, in the series of aligned holes of that particular passage, such as 44.

In order to use, and in using the above-mentioned bolting means to releasably connect the metallic flange 120, the gasket 30, and the plastic flange 20 (and thereby, indirectly and in effect, releasably connect metallic conduit 10 to plastic conduit 100), my basic five-step method must be modified to include, prior to the step of connecting together the said flanges 120 and 20 and the said gasket 30, the additional steps of:

a. forming a first plurality of identical hollow cylinder-like passages, preferably horizontally disposed, such as 44A in and through plastic flange 20, and such as 44B in gasket 30, and such as 44C in metallic flange 120, with the flanges 20 and 120 and also the gasket 30 having the same number of identical passages;

b. positioning the flanges 20 and 120, and also the gasket 30 which is interposed therebetween, so that their respective first plurality of identical passages, such as 44A, 44B and 44C, are aligned and are in registration and which, in fact, form resultant individual continuous hollow passages, such as 44;

c. inserting, in a removable manner a bolt, preferably of the insulating type, such as 41, which has a threaded shank portion, such as 41A, in each of the identical passages which are in registration, such as 44A, 44B and 44C, with a portion of each bolt shank protruding from the resultant continuous hollow passages, such as 44, formed by the registration of 44A, 44B and 44C (More accurately, the bolt shank portion protrudes from the last of the aligned passages, such as 44C.);

d. and, engaging, in a removable manner, a nut, preferably of the insulating type, such as 41B, on the protruding portion of each bolt shank, such as 41A.

It is to be noted and remembered that, although conduits 10 and 100 are disposed in a horizontal position, they would in fact be pitched downwardly toward the desired direction of flow, if said conduits 10 and 100 were components of an underground liquid-carrying or fluid-carrying pipe system.

2. SPECIFIC ADAPTATIONS OF MY METHOD

A. As to An End Pipe Seal Assembly

Figure 2:
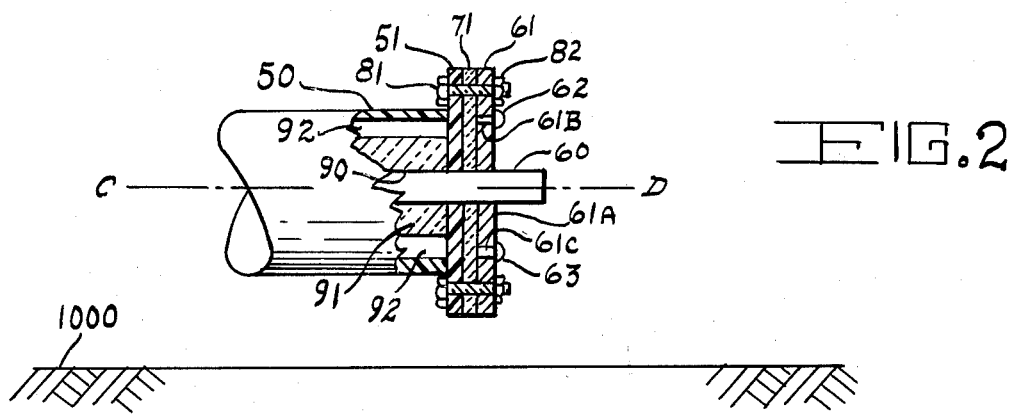
FIGS. 2 and 3 are side elevation views, each in simplified schematic form, partially in cross section and partially fragmented, of two end pipe seal assemblies, each showing the results of the performance of the steps of adaptations of my basic inventive method; and, FIG. 4 is a side elevation view, in simplified schematic form, partially in cross section and partially fragmented, and not to scale, of an anchor plate assembly which includes a metallic conduit having two ends, showing how another adaptation of my basic inventive method can be used to connect a plastic conduit to each end of the anchor plate assembly conduit.

With reference to FIG. 2, therein is shown, in a side elevation view, in simplified schematic form, partially in cross section and partially fragmented, an end pipe seal assembly, and the result of the performance of the steps of an adaptation of my basic inventive method.

It is here pointed out, for those not fully acquainted with the piping art and, more particularly, with an underground piping system for conveying and conducting a thermally active fluid such as steam, that an end seal (or, more accurately, an end pipe seal assembly) is used in such a piping system when going from underground (i.e., subsoil) to above the ground, and said end seal may be at, and parallel with, the ground surface or, alternatively, it may be above and perpendicular to the ground surface, as desired or as necessary. The "seal" is at the "end" of the pipe line so to speak, and thence the "end pipe seal" assembly designation.

Again with reference to FIG. 2, the end pipe seal assembly therein is above the ground surface 1000. By the use of my inventive method, described above, fiberglass reinforced plastic flange 51 has been affixed to fiberglass reinforced plastic outer conduit 50; steel flange 61 has been affixed to metallic steam line inner pipe 60; plastic conduit 50 and metallic pipe 60 have been positioned so that they are longitudinally and axially aligned (with resultant coincident longitudinal axis C-D), and so that they are facing end-to-end, and also so that they are adjacent to each other, with plastic flange 51 directionally opposed to metallic flange 61; full face asbestos gasket 71 has been interposed between the flanges 51 and 61; and, the flanges 51 and 61 and also the gasket 71 have been releasably connected together by a plurality of nuts and bolts, such as 81 and 82, which preferably are of the insulating type.

Still with reference to FIG. 2, the end seal is formed, in its final aspect, by modifying my above-described method by performing the additional steps of:

a. forming a second plurality of identical hollow passages, such as 61B and 61C, through the metallic flange 61;

b. and, attaching a vent plug, such as 62 or 63, to each of the hollow passages, such as 61B, at the external surface 61A of metallic flange 61.

Also shown in FIG. 2 are: inner metallic steam line pipe (or conduit) 90 located within, and aligned coaxially with, fiberglass reinforced plastic conduit 50; thermal insulating material 91, such as calcium silicate, removably attached to, surrounding, and abutting with the external surface of pipe 90; and, annular air space 92. Not shown, in the interest of not unnecessarily encumbering FIG. 2, are a plurality of peripheral bands which encircle, and releasably hold, insulating material 91 to inner pipe 90, and a plurality of spacers which maintain the annular air space 92 and which also support inner pipe 90 and insulating material 91 in their respective position of coaxial relationship to conduit 50.

B. As to Another End Pipe Seal Assembly

Figure 3:
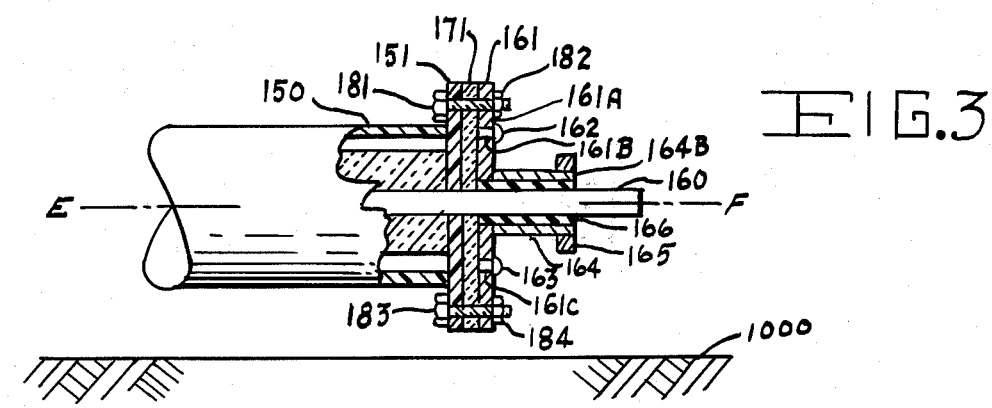

With reference to FIG. 3, therein is shown, in a side elevation view, in simplified schematic form, partially in cross section and partially fragmented, another end pipe seal assembly, and a pictorial representation of the result of the performance of the steps of still another adaptation and/or variation of my basic inventive method.

The end seal shown in FIG. 3 is above the ground surface 1000, as was the other pipe seal in FIG. 2. The end seal in FIG. 3 is formed by, and between, plastic conduit 150, made preferably of fiberglass reinforced plastic, and metallic conduit 160, by the use of an adaptation and/or a variation of my basic inventive method. Plastic conduit 150 has a cross section, and a longitudinal axis, and a free and open end to which a plastic flange 151, preferably made of fiberglass reinforced plastic, is affixed. The metallic conduit 160 (which may be, for example, a steel steam line pipe) is subject to significant expansion (because, for example, of thermal effects) and has a cross section which is smaller (e.g., a smaller diameter, if a cylindrical conduit) than the cross section of plastic conduit 150, also has a longitudinal axis, and further has a free and open end.

More specifically, but still in somewhat broad terms, the end seal shown in FIG. 3 is formed by a variation and an adaptation of my basic method, and comprises, essentially, the steps of:

a. positioning the plastic conduit, such as 150, and the metallic conduit, such as 160, so that they are longitudinally and axially aligned (with the result that their respective longitudinal axes coincide and the resultant longitudinal axis is E-F), and so that they 150 and 160 are facing open end-to-open end, and also so that they 150 and 160 are adjacent;

b. encircling the free and open end of the metallic conduit, such as 160, with a first metallic flange, such as 161, having an external surface, such as 161A, and also having a plurality of identical hollow passages, such as 161B and 161C, therethrough (i.e., in and through flange 161);

c. attaching a vent plug, such as 162 or 163, to each of the said plurality of identical hollow passages (i.e., such as attaching vent plug 162 to passage 161B, and vent plug 163 to passage 161C), in the first metallic flange 161 at the external surface, such as 161A, of the first metallic flange 161;

d. disposing a metallic coupling sleeve, such as 164, having a first end 164A and a second end 164B, around the metallic conduit 160, with the first end 164A of the metallic sleeve 164 in contact with the external sleeve 161A of the first metallic flange 161;

e. affixing, preferably by welding, the first end 164A of the metallic sleeve 164 to the external surface 161A of the first metallic flange 161;

f. affixing, preferably by welding, a second metallic flange, such as 165, to the second end 164B of the metallic sleeve 164;

g. interposing a rubber sleeve, such as 166, between the metallic sleeve 164 and the metallic conduit 160;

h. interposing a gasket, such as 171, preferably of the full face type, of suitable material, preferably asbestos, between, and abutting with, the plastic flange 151 and the first metallic flange 161;

i. and, connecting together, in a releasable manner (such as a bolting means which includes a plurality of insulating type bolts, such as 181 and 183, and a plurality of corresponding insulating type nuts, such as 182 and 184, which are removably engaged to their respective bolts), the plastic flange 151, the gasket 171, and the first metallic flange 161.

The end seal, as shown in FIG. 3, is thereby formed by and between plastic conduit 150 and metallic conduit 160.

C. As to An Anchor Plate Assembly

Figure 4:
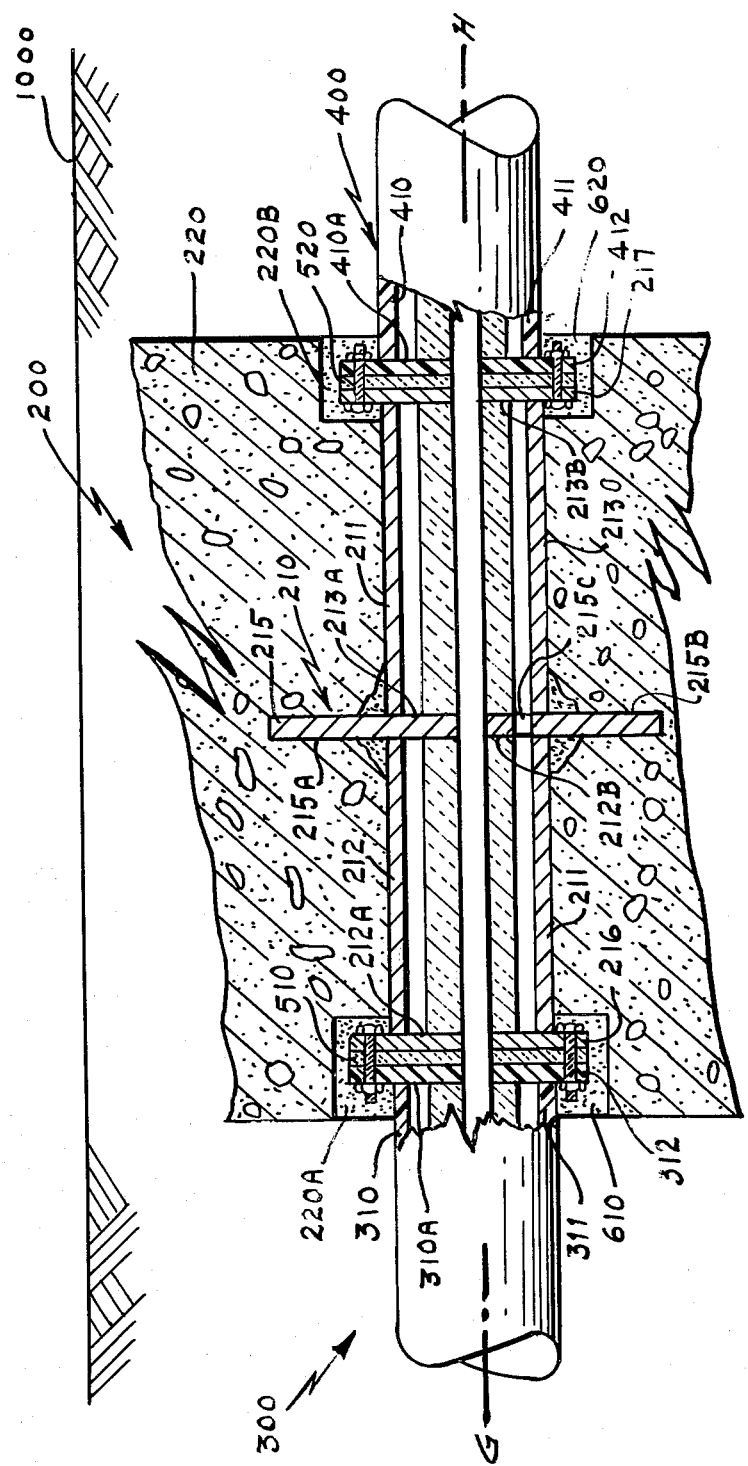

With reference to FIG. 4, there is shown, in a side elevation view, in simplified schematic form, partially in cross section and partially fragmented, and not to scale, an anchor plate assembly releasably connected, by yet another adaptation of my basic inventive method, to plastic conduits.

As a preliminary matter with regard to the pictorial representation of FIG. 4, it is to be noted that, consistent with accepted engineering practices, when a piping system is laid underground to conduct a thermally active fluid, such as steam, restraints are used at predetermined locations underground along the length of the integrated pipe and piping system which is conducting the thermally active fluid. The anchor plate assembly, such as is generally designated as 200, FIG. 4, is below ground surface 1000, FIG. 4; acts as a restraint, such as mentioned above; and prevents, resists or, at the very least, significantly limits the movement(s), if any, of the integrated underground pipe or piping, wherein said movement(s) is (are) caused by the conduction (i.e., flow) of the thermally active fluid within the underground pipe or piping. Such movement(s) is (are) referred to in the art as "thermal movement(s)".

Again with reference to FIG. 4, therein is shown how two plastic conduit assemblies, generally designated respectively as first plastic conduit 300 and second plastic conduit 400 which are pipe section components of an underground piping system that conducts a thermally active fluid, such as steam, are releasably connected, by an adaption of my method, to anchor plate assembly 200.

In the interest of brevity and simplicity, and to avoid unnecessary repetition, pipe sections 300 and 400 are identical, although of course they need not be.

Anchor plate assembly 200 is assumed to include, but not be limited to, for the sake of simplicity in describing the adaptation of my releasable connection method applicable thereto, the following: a metallic conduit 210 which has a longitudinal axis, and which also has an external surface 211, and which includes a first conduit segment 212 which has a first free and open end 212A and a second free and open end 212B and also includes a second conduit segment 213 which also has a first free and open end 213A and a second free and open end 213B; and, a metallic anchor plate 215 which has a longitudinal axis, and which also has a front surface 215A and a rear surface 215B.

The metallic conduit 210 and the anchor plate 215 are preferably made of steel, and the conduit 210 and the plate 215 are positioned so that their respective longitudinal axes coincide with each other and with the longitudinal axis of the anchor plate assembly 200 as a whole, with the result that coincident longitudinal axis G-H is formed.

Anchor plate 215 has a drain hole 215C therethrough, and the plate 215 is disposed between the first segment 212 and the second segment 213 of metallic conduit 210, with the second end 212B of the first segment 212 affixed, preferably by welding, to the rear surface 215B of the anchor plate, with the drain hole 215C passing between, and within, first conduit segment 212 and second conduit segment 213.

The plastic conduits, such as first plastic conduit 310 and second plastic conduit 410 are to be attached to anchor plate assembly 200 (and metallic conduit 210 thereof), and vice versa. First plastic conduit 310, which is preferably made of fiberglass reinforced plastic, has a free and open end 310A, and also has a longitudinal axis, and further has an external surface 311. Similarly, second plastic conduit 410, which also is preferably made of fiberglass reinforced plastic, has a free and open end 410A, and also has a longitudinal axis, and further has an external surface 411.

Still with reference to FIG. 4, my method, which is an adaptation of my basic method disclosed hereinabove, of releasably connecting anchor plate assembly 200 (and metallic conduit 210 thereof) to first plastic conduit 310 and to second plastic conduit 410, comprises essentially the steps of:

a. surrounding the metallic conduit 210 of the anchor plate assembly 200 with concrete, and thereby forming a concrete block, such as 220, having a first recess (or cavity) 220A containing the first end 212A of the first segment 212 of the metallic conduit 210, and also having a second recess (or cavity) 220B containing the second end 213B of the second segment 213 of the metallic conduit 210;

b. affixing, preferably by welding, a first metallic flange 216, made preferably of steel to the first end 212A of the first conduit segment 212, with the first metallic flange 216 being within the first recess or cavity 220A of concrete block 220;

c. affixing, preferably by welding, a second metallic flange 217, made preferably of steel, to the second end 213B of the second conduit segment 213, with the second metallic flange 217 being within the second recess or cavity 220A of concrete block 220;

d. affixing, preferably by bonding with epoxy, a first plastic flange 312, preferably made of fiberglass reinforced plastic, to the free and open end 310A of first plastic conduit 310;

e. affixing, preferably by bonding with epoxy, a second plastic flange 412, preferably made of fiberglass reinforced plastic, to the free and open end 410A of the second plastic conduit 410;

f. positioning the first plastic conduit 310 so that the first plastic conduit 310, and the anchor plate assembly 200, and the metallic conduit 210 thereof, are longitudinally and axially aligned, and also so that the first plastic conduit 310 and the anchor plate assembly 200 are adjacent, and further so that the first plastic flange 312 of the first plastic conduit 310 and the first metallic flange 216 are directionally opposed (i.e., are directly opposite to each other), with the first plastic flange 312 also being within the first recess or cavity 220A of concrete block 220;

g. positioning the second plastic conduit 410 so that the second plastic conduit 410 and the anchor plate assembly 200, and the metallic conduit 210 thereof, are longitudinally and axially aligned, and also so that the second plastic conduit 410 and the anchor plate assembly 200 are adjacent, and further so that the second plastic flange 412 of the second plastic conduit 410 and the second metallic flange 217 are directionally opposed (i.e., are directly opposite to each other), with the second plastic flange 412 also being within the second recess or cavity 220B of concrete block 220;

h. interposing a first gasket 510, preferably of the full face type, of suitable material, such as asbestos, between and abutting with the first plastic flange 312 and the first metallic flange 216;

i. interposing a second gasket 520, preferably of the full face type, of suitable material, such as asbestos, between and abutting with the second plastic flange 412 and the second metallic flange 217;

j. connecting together, in a releasable manner (such as by bolting, using preferably a plurality of insulating type bolts and nuts), the first plastic flange 312, the first gasket 510, and the first metallic flange 216;

k. connecting together, in a releasable manner (such as by bolting, using preferably a plurality of insulating type bolts and nuts), the second plastic flange 412, the second gasket 520, and the second metallic flange 217;

l. filling the first recess or cavity 220A of the concrete block 220, within which are the first plastic flange 312 and the first gasket 510 and the first metallic flange 216, with a mastic 610;

m. and, filling the second recess or cavity 220B of the concrete block 220, within which are the second plastic flange 412 and the second gasket 520 and the second metallic flange 217, with a mastic 611.

The releasable connection, such as shown in FIG. 4, of the anchor plate assembly 200 to the plastic conduits 310 and 410, is, thereby, achieved.

CONCLUSION

While there have been shown and described the unique and fundamental features and steps of my inventive method, as set forth not only in the basic method taught herein, but also as set forth in the adaptations and variations thereof disclosed hereinabove, it is to be understood that various other adaptations of my basic method may be made by those of ordinary skill in the art, without departing from the spirit of my invention. Obviously, my basic inventive method can be used, or can be adapted to be used, to releasably connect any plastic conduit to any metallic conduit, and vice versa, a goal long sought in the art. It is also obvious that the sequence of some of the steps of my basic method, and of my adaptations and variations herein, may further be varied and/or changed without changing the results attained by my inventive method.

What I claim is:

1. The method of connecting, in a releasable manner, an anchor plate assembly to a first and to a second plastic conduit, wherein the anchor plate assembly has a longitudinal axis, and wherein the anchor plate assembly includes a metallic conduit which has a longitudinal axis which coincides with the anchor plate assembly longitudinal axis and which also has an external surface and which comprises a first segment which has first and second free and open ends and a second segment which has first and second free and open ends, and wherein the anchor plate assembly also includes a metallic anchor plate which has a longitudinal axis which coincides with the anchor plate assembly longitudinal axis and which also has a front and a rear surface, and with the anchor plate disposed between the first and the second segments of the metallic conduit, and with the second end of the first segment affixed to the front surface of the anchor plate, and with the first end of the second segment affixed to the rear surface of the anchor plate, and wherein the first and the second plastic conduits each has a free and open end, and also each has a longitudinal axis, and further each has an external surface, comprising the steps of:

a. surrounding the metallic conduit of the anchor plate assembly with concrete, and thereby forming a block having a first recess containing the first end of the first segment of the metallic conduit and also having a second recess containing the second end of the second segment of the metallic conduit;

b. affixing a first metallic flange to the first end of the first segment of the metallic conduit, with the first metallic flange being within the first recess of the concrete block;

c. affixing a second metallic flange to the second end of the second segment of the metallic conduit, with the second metallic flange being within the second recess of the concrete block;

d. affixing a first plastic flange to the free and open end of the first plastic conduit;

e. affixing a second plastic flange to the free and open end of the second plastic conduit;

f. positioning the first plastic conduit so that the first plastic conduit and the anchor plate assembly, and the metallic conduit thereof, are longitudinally and axially aligned, and also so that the first plastic conduit and the anchor plate assembly are adjacent, and further so that the first plastic flange of the first plastic conduit and the first metallic flange are directionally opposed, with the first plastic flange also being within the first recess of the concrete block;

g. positioning the second plastic conduit so that the second plastic conduit and the anchor plate assembly, and the metallic conduit thereof, are longitudinally and axially aligned, and also so that the second plastic conduit and the anchor plate assembly are adjacent, and further so that the second plastic flange of the second plastic conduit and the second metallic flange are directionally opposed, with the second plastic flange also being within the second recess of the concrete block;

h. interposing a first gasket of suitable material between, and abutting with, the first plastic flange and the first metallic flange;

i. interposing a second gasket of suitable material between, and abutting with, the second plastic flange and the second metallic flange;

j. connecting together, in a releasable manner, the first plastic flange, the first gasket, and the first metallic flange;

k. connecting together, in a releasable manner, the second plastic flange, the second gasket, and the second metallic flange;

l. filling the first recess of the concrete block, within which are the first plastic flange and the first gasket and the first metallic flange, with a mastic;

m. and, filling the second recess of the concrete block, within which are the second plastic flange and the second gasket and the second metallic flange, with a mastic.

* * * * *